United States Patent
Alsaad

(10) Patent No.: US 12,402,986 B1
(45) Date of Patent: Sep. 2, 2025

(54) RESEARCH DENTAL MOUNTING AID

(71) Applicant: KING SAUD UNIVERSITY, Riyadh (SA)

(72) Inventor: Norah Hamad Alsaad, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/191,316

(22) Filed: Apr. 28, 2025

(51) Int. Cl.
*A61C 8/00* (2006.01)
*A61C 13/08* (2006.01)
*A61C 13/15* (2006.01)
*A61C 19/00* (2006.01)

(52) U.S. Cl.
CPC .......... *A61C 8/0089* (2013.01); *A61C 13/081* (2013.01); *A61C 19/003* (2013.01)

(58) Field of Classification Search
None
See application file for complete search history.

(56) References Cited

U.S. PATENT DOCUMENTS

| | | | |
|---|---|---|---|
| 2,510,152 A | 6/1950 | Stoll | |
| 3,693,260 A | 9/1972 | Hernandez | |
| 4,174,570 A * | 11/1979 | Schwartz | A61C 9/002 433/53 |
| 4,412,822 A | 11/1983 | Blechner | |
| 5,427,906 A * | 6/1995 | Hansen | A61C 8/0048 433/173 |
| 5,688,123 A * | 11/1997 | Meiers | A61C 8/0001 433/172 |
| 5,749,725 A * | 5/1998 | Chinlund | A61C 11/08 433/60 |
| 5,785,525 A * | 7/1998 | Weissman | A61C 8/0018 433/176 |
| 6,561,805 B2 * | 5/2003 | Kumar | A61C 8/0089 206/368 |
| 7,377,781 B1 * | 5/2008 | Karapetyan | A61C 8/0018 433/172 |
| 8,899,984 B2 * | 12/2014 | Llop | A61C 8/0089 433/215 |
| 9,078,720 B2 * | 7/2015 | Boku | A61K 6/884 |
| 9,883,926 B2 * | 2/2018 | Haralampopoulos | A61C 8/0048 |
| 10,939,983 B2 * | 3/2021 | Jang | A61C 8/0016 |
| 11,464,609 B2 * | 10/2022 | Yu | A61C 13/0004 |

(Continued)

FOREIGN PATENT DOCUMENTS

WO 2016182214 A1 11/2016

*Primary Examiner* — Jethro M. Pence
(74) *Attorney, Agent, or Firm* — Nath, Goldberg & Meyer; Joshua B. Goldberg

(57) ABSTRACT

A method of using a kit includes placing each of at least one chamber into an enclosure; pouring resin into each of the at least one chamber prior to or after the placing step; inserting each of at least one dental implant into a respective one of each of at least one recess of a bottom portion of an upper component; immersing each of the at least one dental implant into a respective one of the at least one chamber containing a resin by moving the upper component to a predetermined height; curing the resin in each of the at least one chamber while each of the at least one dental implant is being immersed in the resin to obtain at least one resin-encapsulated dental implant; and removing each of the at least one resin-encapsulated dental implant from the respective one of the at least one chamber.

12 Claims, 8 Drawing Sheets

(56) References Cited

U.S. PATENT DOCUMENTS

| | | | |
|---|---|---|---|
| 11,877,901 B2* | 1/2024 | Kohnen | A61C 13/0019 |
| 2007/0141533 A1* | 6/2007 | Ford | A61C 8/0012 |
| | | | 433/201.1 |
| 2007/0196782 A1 | 8/2007 | Noguchi | |
| 2011/0123950 A1* | 5/2011 | Carlton | A61C 8/0089 |
| | | | 433/173 |
| 2011/0318706 A1* | 12/2011 | Brajnovic | A61C 13/26 |
| | | | 433/174 |
| 2012/0064488 A1* | 3/2012 | Lazarof | A61C 8/0033 |
| | | | 433/173 |
| 2013/0101962 A1* | 4/2013 | Howe | A61C 13/0006 |
| | | | 264/17 |
| 2013/0266913 A1* | 10/2013 | Brajnovic | A61C 8/0089 |
| | | | 433/173 |
| 2014/0342306 A1 | 11/2014 | Lerner | |
| 2018/0228578 A1* | 8/2018 | Liston | A61C 13/34 |
| 2018/0333813 A1* | 11/2018 | Hornbeck | A61C 13/0018 |
| 2019/0239988 A1* | 8/2019 | Heinz | A61C 13/081 |
| 2022/0096210 A1* | 3/2022 | Medgaus | A61C 8/0075 |
| 2022/0323184 A1* | 10/2022 | Weitzel | A61C 8/0037 |
| 2023/0240814 A1* | 8/2023 | Noorthoek | A61C 8/008 |
| | | | 433/173 |

* cited by examiner

RESEARCH DENTAL MOUNTING AID

FIELD AND BACKGROUND

The disclosure of the present application relates to a kit, and particularly to a kit and a method of using the kit for forming at least one resin-encapsulated dental implant.

DESCRIPTION OF RELATED ART

Dental implants have gained significant popularity over the decades as a restorative solution for missing teeth. With their minimal impact on surrounding teeth and high success rate of up to 95%, dental implants have become a reliable alternative to dentures and fixed bridgework. Since their introduction by Branemark over fifty years ago, significant progress has been made in optimizing the mechanical properties and reducing complications of dental implants through extensive preclinical research.

In preclinical research, dental implants are tested on non-human subjects in a controlled laboratory environment to evaluate their safety, biocompatibility, effectiveness, and functionality. After passing the rigorous preclinical evaluations, the dental implants are then tested in a clinical stage on human participants.

Customarily during preclinical research, a single dental implant is mounted on a conventional dental implant mount and immersed in dental resin to be cured. During the curing step, the dental resin undergoes shrinkage resulting in dimensional changes which cause inaccuracies in the mounting process. This often necessitates repeating the process, leading to wasted time and materials. Further, conventional dental implant mounts are known to produce highly unpredictable products, have difficulty in producing three dimensional products, and are challenging to control.

In light of the above, a need remains for a kit and a method of using the kit for forming at least one resin-encapsulated dental implant for solving the aforementioned problems.

SUMMARY

The present subject matter relates to a kit which, in one embodiment, includes an upper component. The upper component can include a top portion, a bottom portion, and at least one 2 side portion. Each of the at least one side portion is perpendicular to the top portion and the bottom portion. The top portion can include at least one primary slot in proximity to one of the at least one side portion. The bottom portion can include at least one secondary slot in proximity to the one of the at least one side portion and in communication with the at least one primary slot of the top portion. The bottom portion can also include at least one recess. Each of the at least one recess can be configured to receive each of at least one dental implant. The kit can also include a lower component. The lower component can include a plurality of vertical walls forming an enclosure therein. The enclosure can be configured to receive at least one chamber. Each of the at least one chamber can be configured to receive a resin. At least one of the plurality of vertical walls can include at least one tertiary slot. The kit can further include at least one vertical component. Each of the at least one vertical component can include a first section, a second section, and a third section. The second section can be located between the first section and the third section. The first section and the second section can be configured to receive one of the at least one primary slot and one of the at least one secondary slot of the top portion and the bottom portion, respectively, of the upper component. The third section can be configured to receive one of the at least one tertiary slot of the lower component.

In an embodiment, each of the at least one recess can include a rubber lining which can be configured to secure one of the at least one dental implant, respectively.

In another embodiment, the rubber lining can have a thickness of 3 mm.

In an additional embodiment, one or more of the at least one side portion can have a locking mechanism which can be configured to allow the upper component to be secured in place when engaged and/or vertically movable along the at least one vertical component when disengaged.

In a supplementary embodiment, the locking mechanism can be a screw.

In a further embodiment, the at least one vertical component can include a channel which can include a plurality of screw channels which can be configured to receive the screw or the locking mechanism.

In an embodiment, the channel can be located at the second section of the at least one vertical component.

In another embodiment, the locking mechanism can be configured to rotate in a first direction to secure the upper component to the at least one vertical component and/or rotate in a second direction to vertically move the upper component relative to the at least one vertical component.

In an additional embodiment, the at least one vertical component can include a built-in ruler which can be configured to allow the upper component to be accurately levelled at a predetermined height.

In a supplementary embodiment, the at least one chamber can include a silicone rubber lining.

In an embodiment, the at least one vertical component can be configured to separate from the upper component by slidably releasing the at least one primary slot and/or the at least one secondary slot of the top portion and the bottom portion, respectively, away from the first section of the at least one vertical component.

In another embodiment, the at least one vertical component can be configured to separate from the lower component by slidably releasing the third section of the at least one vertical component away from a respective one of the at least one tertiary slot of the at least one of the plurality of vertical walls of the lower component.

In a further embodiment, the present subject matter relates to a method of using a kit as described herein, wherein the method can include obtaining at least one chamber; placing each of the at least one chamber into the enclosure; pouring the resin into each of the at least one chamber prior to or after the placing step; obtaining at least one dental implant; inserting each of the at least one dental implant into a respective one of each of the at least one recess of the bottom portion of the upper component; inserting the third section of the at least one vertical component into a respective one of the at least one tertiary slot of the at least one of the plurality of vertical walls of the lower component; inserting the at least one primary slot and the at least one secondary slot of the top portion and the bottom portion, respectively, of the upper component on to the first section and the second section of a respective one of the at least one vertical component; immersing each of the at least one dental implant into a respective one of the at least one chamber containing the resin by moving the upper component to a predetermined height; curing the resin in each of the at least one chamber while each of the at least one dental implant is being immersed in the resin to obtain at least one resin-encapsulated dental implant; and removing each of the at least one resin-encapsulated dental implant from the respective one of the at least one chamber.

In an embodiment, a center bottom of each of the at least one chamber can include a first centered marking which correspond to each of a plurality of second centered markings on a bottom of the enclosure, and wherein each of the first centered markings and each of the plurality of second centered markings correspond to a center of each of the at least one recess of the bottom portion, respectively.

In another embodiment, the placing step can further include placing each of the at least one chamber into the respective enclosure and aligning each of the first centered markings from each of the center bottom of each of the at least one chamber with the respective one of each of the plurality of second centered markings on the bottom of the enclosure.

In an additional embodiment, prior to the curing step, the method can further include rotating the locking mechanism in the first direction to cause the locking mechanism to be received in one of the plurality of screw channels thereby securing the upper component to the at least one vertical component.

In a supplementary embodiment, prior to the removing step, the method can further include rotating the locking mechanism in the second direction to cause the locking mechanism to be withdrawn from the one of the plurality of screw channels thereby allowing the upper component to vertically move relative to the at least one vertical component.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
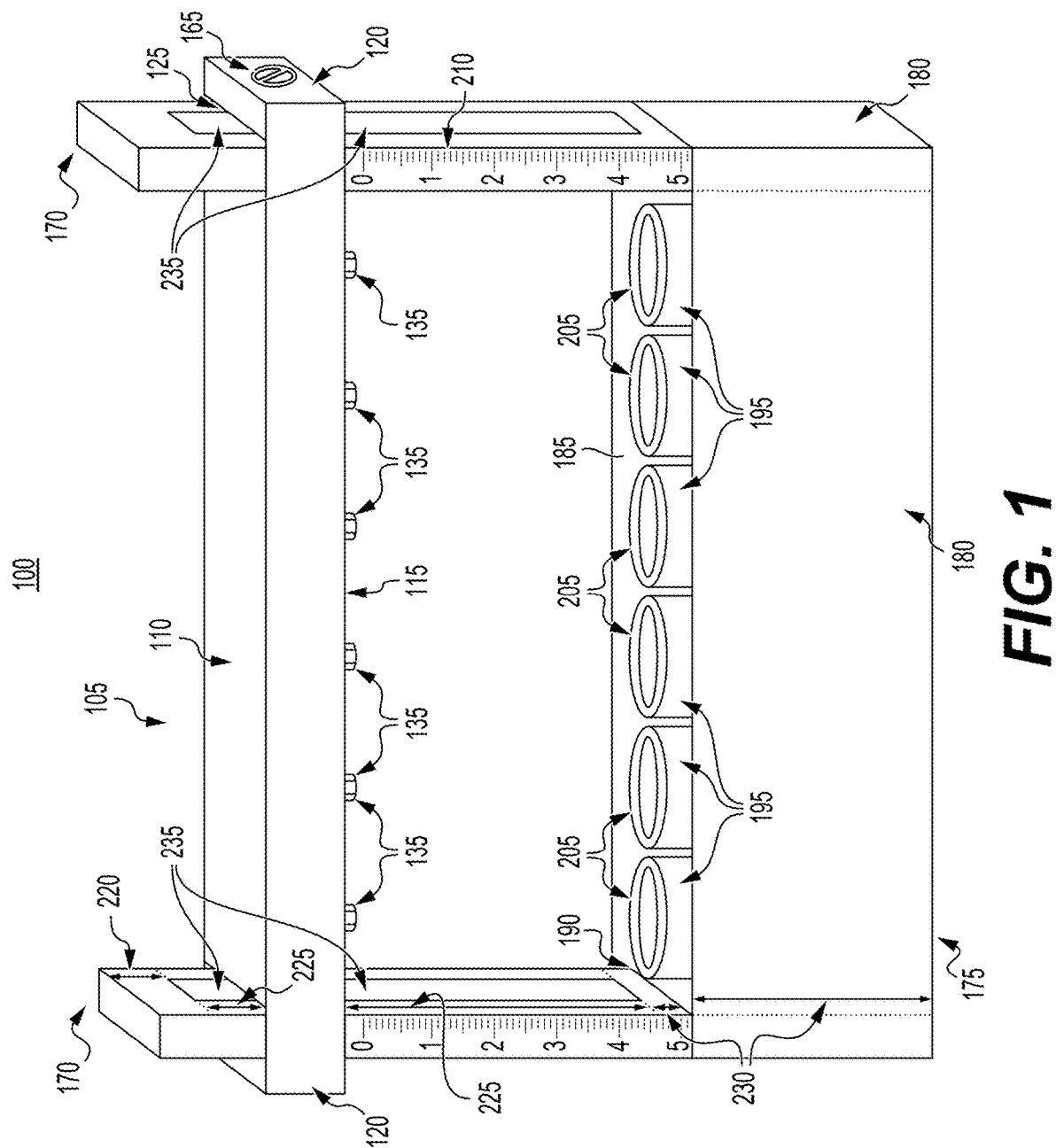
FIG. 1 depicts an overall view of a kit with at least one recess on a bottom portion of an upper component.

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Figure 2:
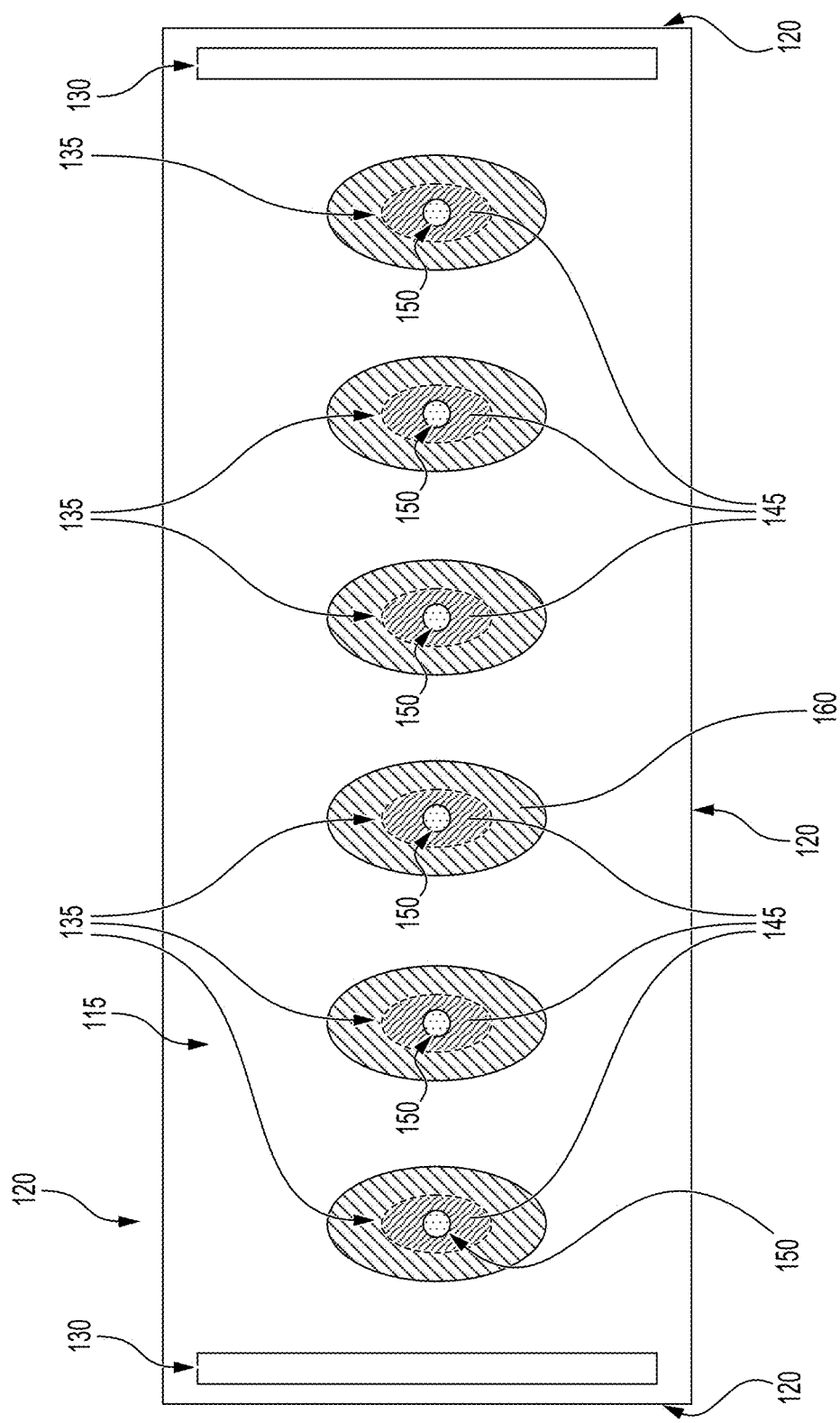
FIG. 2 depicts a view of the bottom portion of the upper component.
Figure 3:
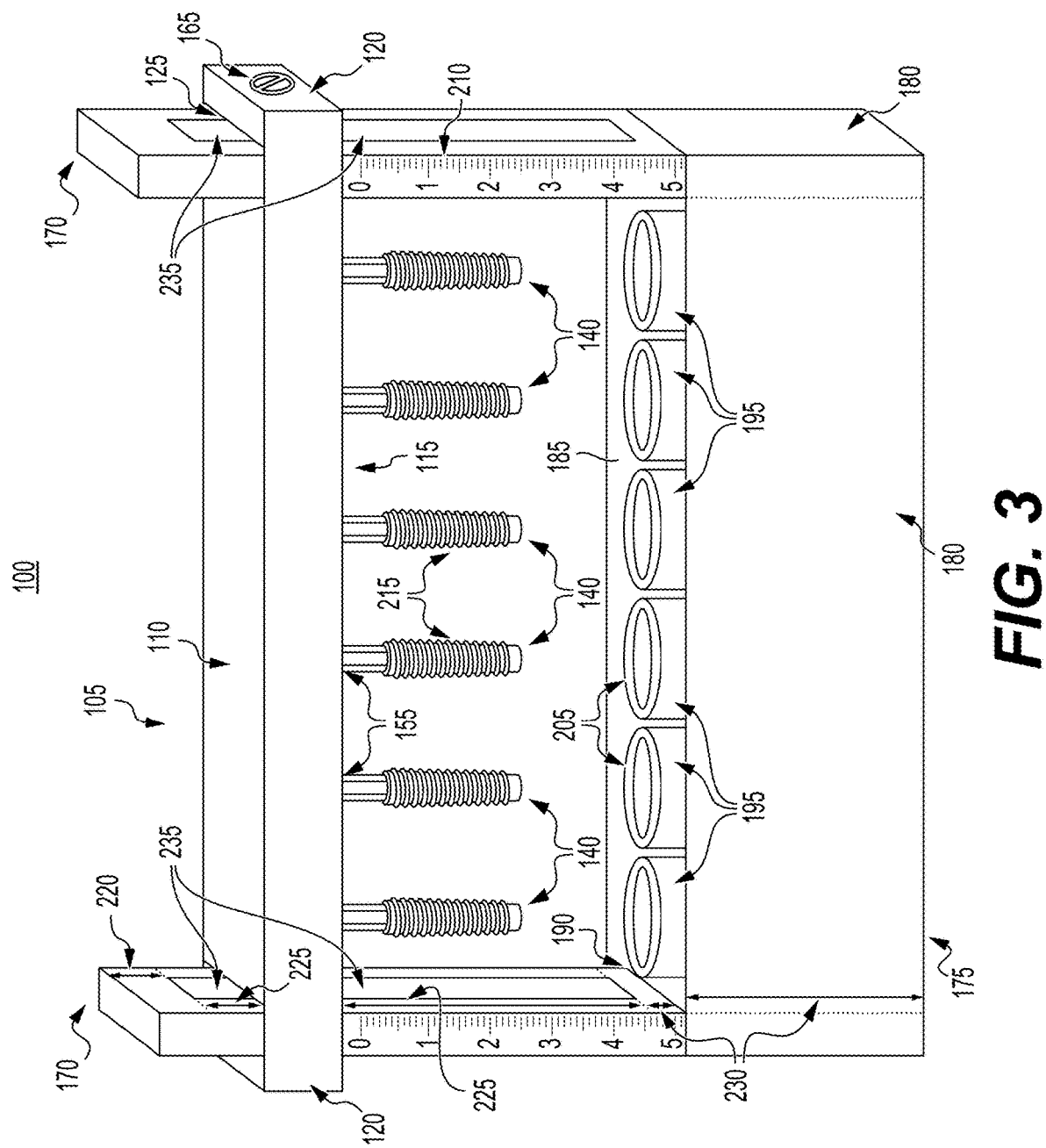
FIG. 3 depicts another overall view of the kit with each of at least one dental implant secured to each of the at least one recess on the bottom portion of the upper component.

FIGS. 1-7 depict, in an embodiment, a kit 100 which includes an upper component 105. In a non-limiting example, the upper component 105, which can be movable, can be made of a thermoplastic material. The thermoplastic material can be abrasion resistant polycarbonate. The upper component 105 can include a top portion 110, a bottom portion 115, and at least one side portion 120. Each of the at least one side portion 120 is perpendicular to the top portion 110 and the bottom portion 115. The top portion 110 can include at least one primary slot 125 in proximity to one of the at least one side portion 120. In another non-limiting embodiment, the at least one primary slot 125 can be a rectangular (longitudinal) slot. In a further non-limiting embodiment, the top portion 110 can be devoid of any holes or recesses except for the at least one primary slot 125 as shown in FIGS. 1 and 3.

In an embodiment, the bottom portion 115 can include at least one secondary slot 130 in proximity to the one of the at least one side portion 120, as shown in FIG. 2, and in communication with the at least one primary slot 125 of the top portion 110. In certain non-limiting embodiments, the at least one secondary slot 130 can be a rectangular (longitudinal) slot. The bottom portion 115 can also include at least one recess 135 as depicted in FIGS. 1-2. Each of the at least one recess 135 can be configured to receive each of at least one dental implant 140 as shown in FIG. 3. In an embodiment, each of at least one dental implant 140 can be removed from or secured to a respective one of the at least one recess 135. In this regard, each of the at least one recess 135 can include a rubber lining 145 located therein which can be configured to secure one of the at least one dental implant 140, respectively, as shown in FIGS. 2-3. Specifically, each of the rubber lining 145 located within each of the at least one recess 135 forms a holding space 150 therein and can be configured to secure one of the at least one dental implant 140, respectively as shown in FIGS. 2-3. The center of each of the holding space 150 (which is also the center of each of the at least one recess 135) of each of the at least one recess 135 can be equal distances apart from each other as shown in FIG. 2. The rubber lining 145 can have a thickness of about 3 mm or 3 mm. It was found that when the rubber lining 145 within each of the at least one recess 135 was 3 mm thick, the loxim 155 of each of the at least one dental implant 140, as depicted in FIG. 3, was tightly secured via friction to the holding space 150 of the respective one of the at least one recess 135. The outer circumferential surface of each of the at least one recess 135 can have a lining 160 exteriorly surrounding therefrom as shown in FIG. 2.

In an embodiment, one or more of the at least one side portion 120 can have a locking mechanism 165 which can be configured to allow the upper component 105 to be secured in place when engaged, as shown in FIGS. 1 and 3, and/or vertically movable along at least one vertical component 170 when disengaged. According to this embodiment, the locking mechanism 165 can be configured to rotate in a first direction (clockwise direction) to secure the upper component 105 to the at least one vertical component 170 and/or rotate in a second direction (counterclockwise direction) to vertically move the upper component 105 relative to the at least one vertical component 170 as described herein. In a particular non-limiting embodiment, the two shortest side portions of the at least one side portion 120 of the upper component 105, which can be a rectangular shape as shown in FIGS. 1 and 3, can each have the locking mechanism 165. In some non-limiting embodiments, the locking mechanism 165 can be a screw. The screw can be an anchorage titanium screw.

As shown in FIGS. 1 and 3, the kit 100 can also include a lower component 175. The lower component 175, which can be fixed (unmovable), can be made of titanium which can provide superior durability and resistance to hazards commonly encountered in dental environments. The lower component 175 can include a plurality of vertical walls 180 forming an enclosure 185 therein. At least one of the plurality of vertical walls 180 can include at least one tertiary slot 190 as depicted in FIGS. 1 and 3-4.

Figure 4:
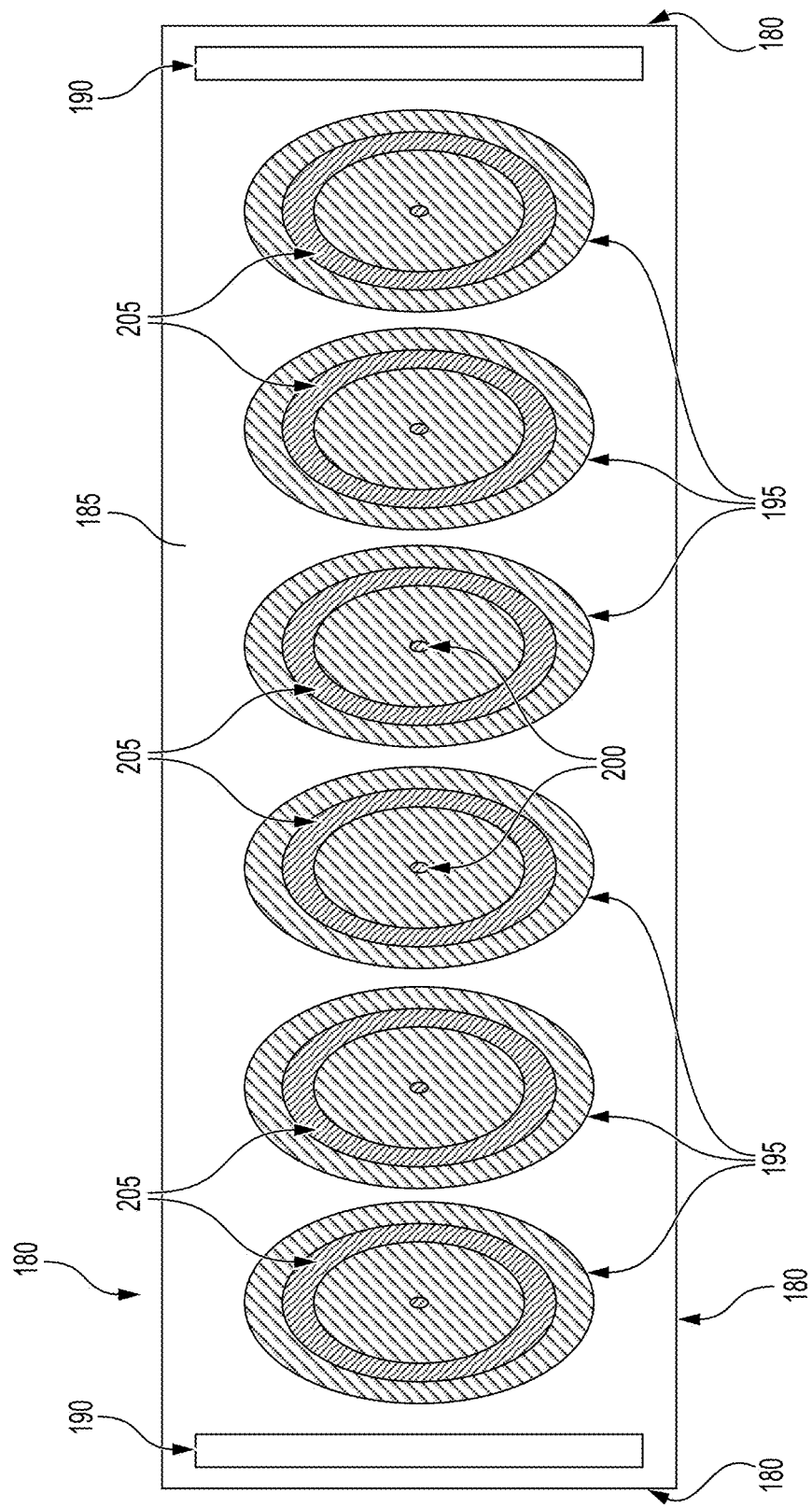
FIG. 4 depicts a top view of an enclosure of a lower component.

In an embodiment, the enclosure 185 can be configured to receive at least one chamber 195 as shown in FIGS. 1 and 3-5. The outer circumferential surface of each of the at least one chamber 195 can be spaced about 2 mm apart from each other as shown in FIG. 4. A center bottom of each of the at least one chamber 195 can include a first centered marking 200, as depicted in FIG. 4, which correspond to each of a plurality of second centered markings (not shown) on a bottom of the enclosure 185. Each of the first centered markings 200 and each of the plurality of second centered markings correspond to the center (the center of each of the holding space 150 as mentioned above and shown in FIG. 2) of each of the at least one recess 135 of the bottom portion 115, respectively.

Figure 5:
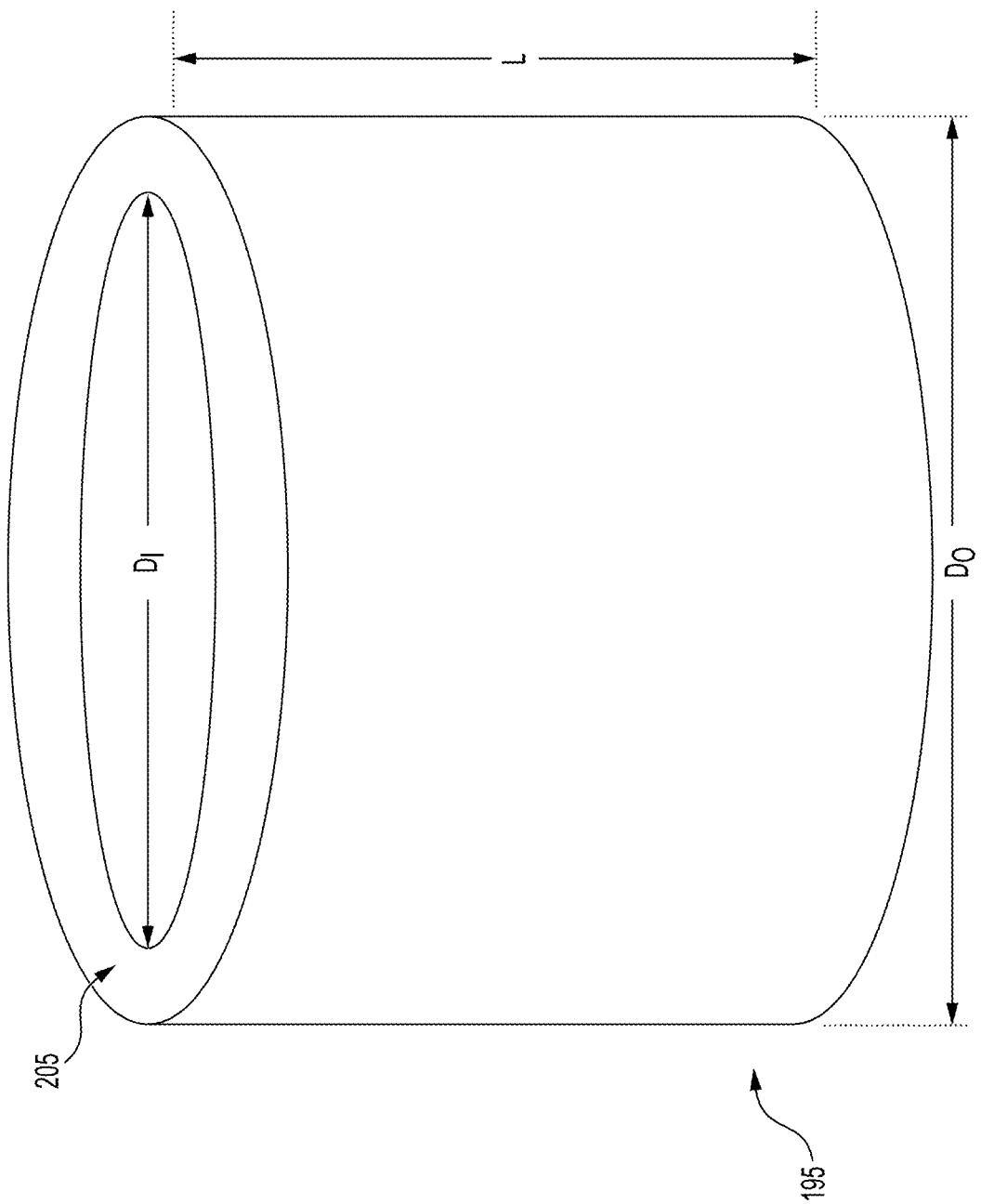
FIG. 5 depicts a view of a chamber with a silicone lining.

As depicted in FIG. 5, each of the at least one chamber 195 can have dimensions of about 20 mm in length (L), about 30 mm in inner diameter (DI), and about 35 mm in outer diameter (Do). In an embodiment, each of the at least one chamber 195 can include a silicone rubber lining 205 located along all the internal surfaces of each of the at least one chamber 195 as shown in FIGS. 1 and 3-5. The silicone rubber lining 205 within each of the at least one chamber 195 can be durable and can ensure easy removal of a resin material post curing as described herein. As a non-limiting example, the silicone rubber lining 205 can have a thickness of about 5 mm.

In an embodiment, each of the at least one chamber 195 can be configured to receive a resin (not shown). In another non-limiting example, the resin can be dental thermoplastic resin selected from the group consisting of polyamides, acetal, epoxy, polystyrene, polycarbonate, polyurethane, acrylic, other thermoplastic resins, and a combination thereof.

As mentioned previously, the kit 100 can include the at least one vertical component 170 as shown in FIGS. 1, 3, and 6-7. Each of the at least one vertical component 170 can include a built-in ruler 210 configured to allow the upper component 105 to be accurately levelled at a predetermined height. While each of the built-in ruler 210 are shown in FIGS. 1 and 3 to be on a front side of each of the at least one vertical component 170, it should be understood that the built-in ruler 210 can be on a back side or both the front side and the back side of each of the at least one vertical component 170 without departing from the present subject matter. In a non-limiting embodiment, the numerical values of the built-in ruler 210 can be based on millimeters (mm). While the numerical values of the built-in ruler 210 can be based on millimeters, it should be noted that other units of measurement can be used without departing from the present subject matter. In an embodiment, the predetermined height can be the vertical height of the upper component 105 whereby the implant body 215 of each of the at least one dental implant 140, as shown in FIG. 3, can be immersed at a desired height into the respective one of the at least one chamber 195 containing the resin. The desired height can include having the implant body 215 of each of the at least one dental implant 140 be immersed completely or partially within the resin of the respective one of the at least one chamber 195.

In an embodiment, each of the at least one vertical component 170 can include a first section 220, a second section 225, and a third section 230 as shown in FIGS. 1, 3, and 6-7. The second section 225 can be located between the first section 220 and the third section 230.

Figure 6:
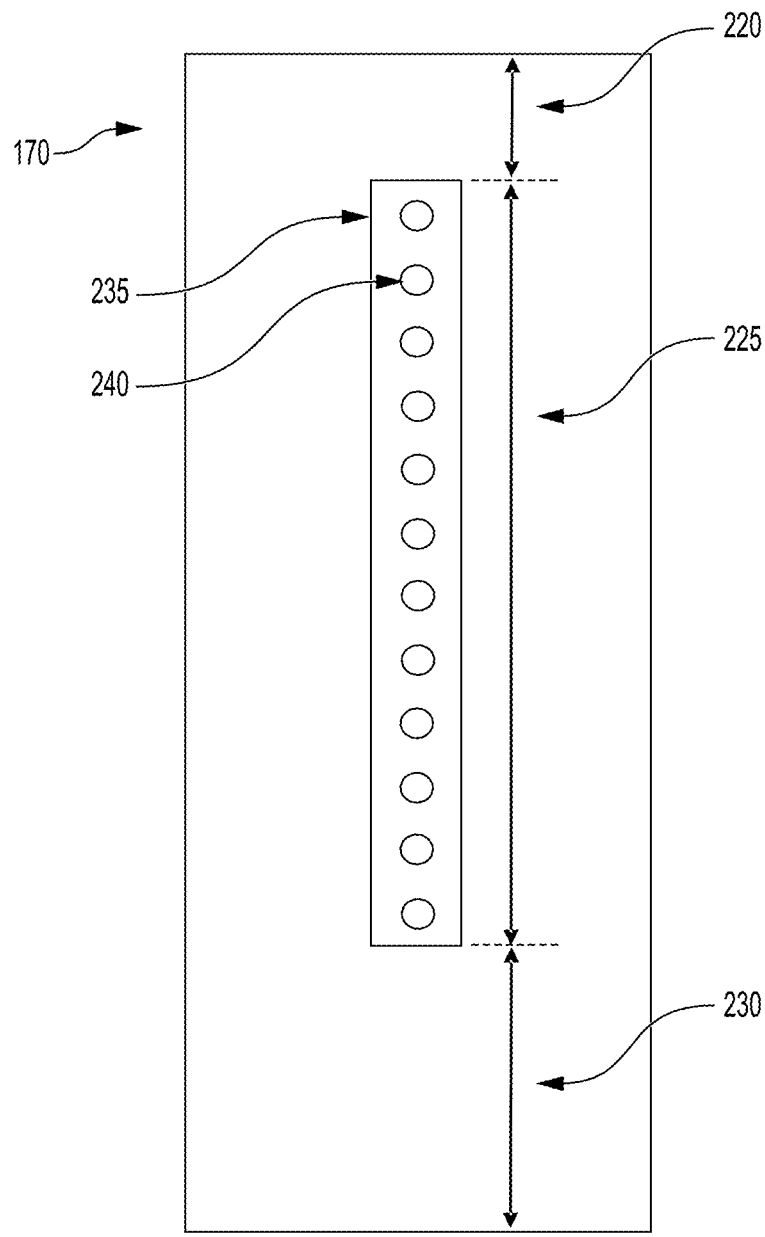
FIG. 6 depicts a first embodiment of at least one vertical component having a channel with a plurality of screw channels formed therein.
Figure 7:
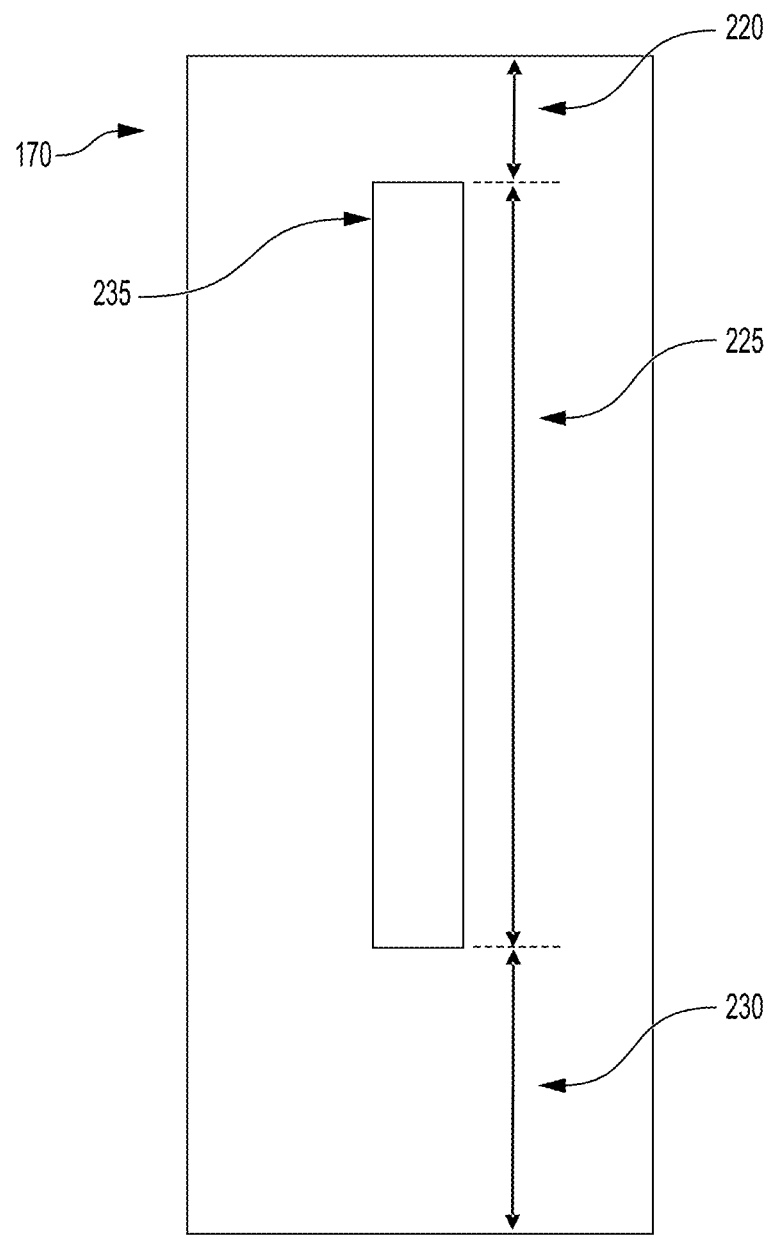
FIG. 7 depicts a second embodiment of at least one vertical component having a channel devoid of the plurality of screw channels.

In an embodiment, each of the at least one vertical component 170 can include a channel 235 which can be located at the second section 225 of the at least one vertical component 170 as shown in FIGS. 1, 3, and 6-7. In another non-limiting embodiment as shown in FIG. 6, the channel 235 of each of the at least one vertical component 170 can include a plurality of screw channels 240 which can be configured to receive the locking mechanism 165 (the screw) as described herein. Conversely, in a further non-limiting embodiment as shown in FIG. 7, the channel 235 of each of the at least one vertical component 170 can be devoid of the plurality of screw channels 240. In this regard, the channel 235 can be configured to receive the locking mechanism 165 (the screw).

In an embodiment, the first section 220 and the second section 225 can be configured to receive one of the at least one primary slot 125 and one of the at least one secondary slot 130 of the top portion 110 and the bottom portion 115, respectively, of the upper component 105. The third section 230 can be configured to receive one of the at least one tertiary slot 190 of the lower component 175. In this context, the receiving steps of the at least one primary slot 125, the one of the at least one secondary slot 130, and the one of the at least one tertiary slot 190 can allow the kit 100 to be assembled as shown in FIGS. 1 and 3.

Conversely, in an embodiment, the at least one vertical component 170 can be configured to separate from the upper component 105 by slidably releasing the at least one primary slot 125 and/or the at least one secondary slot 130 of the top portion 110 and the bottom portion 115, respectively, away from the first section 220 of the at least one vertical component 170 (hereinafter referred as "first separation step"). Likewise, the at least one vertical component 170 can also be configured to separate from the lower component 175 by slidably releasing the third section 230 of the at least one vertical component 170 away from a respective one of the at least one tertiary slot 190 of the at least one of the plurality of vertical walls 180 of the lower component 175 (hereinafter referred as "second separation step"). Corresponding to this embodiment, the separation steps of the at least one primary slot 125, the one of the at least one secondary slot 130, and the one of the at least one tertiary slot 190 can allow the kit 100 to be disassembled.

Figure 8:
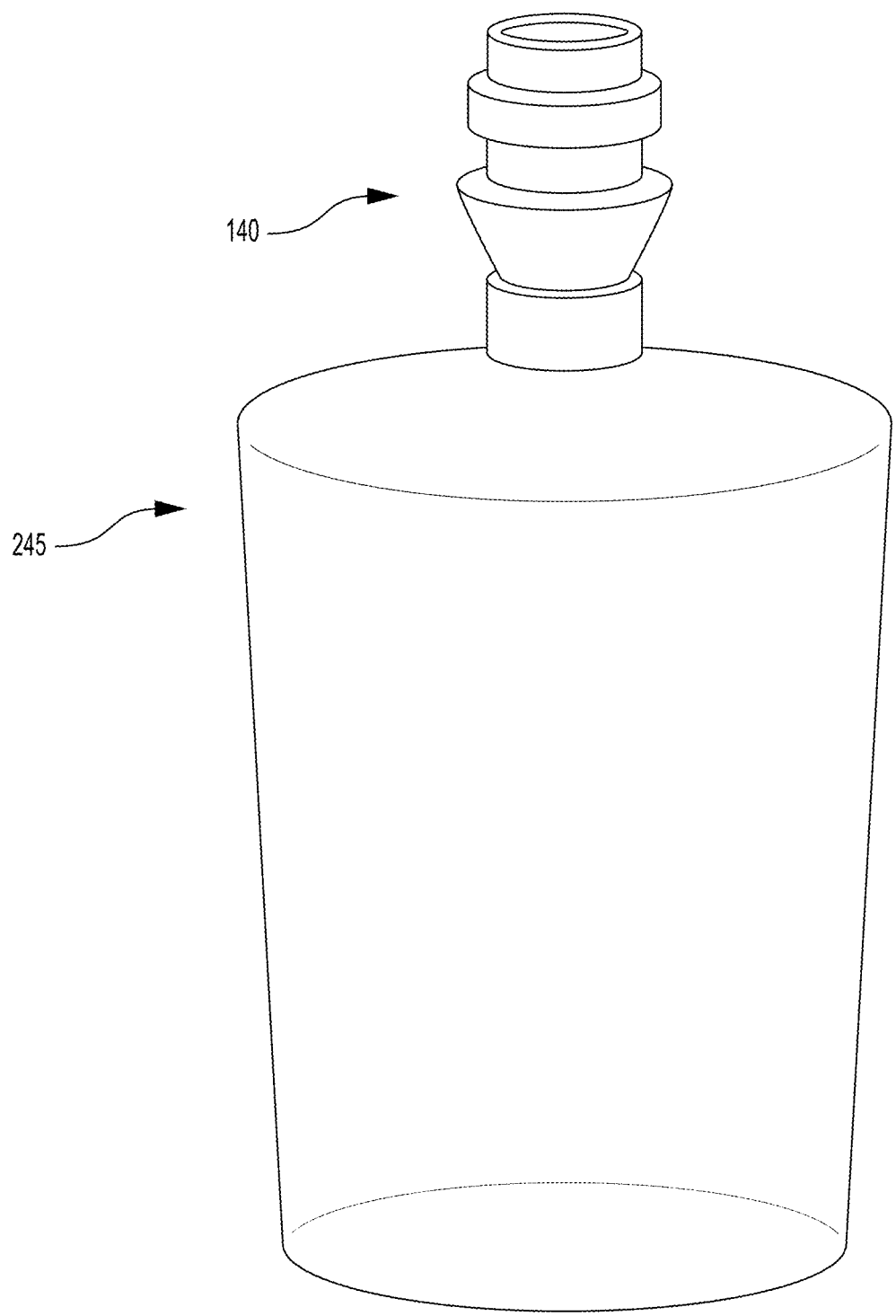
FIG. 8 depicts a formed at least one resin-encapsulated dental implant using the kit.

In a further embodiment, the present subject matter relates to a method of using the above kit 100 for forming at least one resin-encapsulated dental implant 245 as shown in FIG. 8. The method can begin with obtaining the at least one chamber 195 and placing each of the at least one chamber 195 into the enclosure 185. In an embodiment, the placing step can further include placing each of the at least one chamber 195 into the respective enclosure 185 and aligning each of the first centered markings 200 from each of the center bottom of each of the at least one chamber 195 with the respective one of each of the plurality of second centered markings on the bottom of the enclosure 185. In this aspect, each of the first centered markings 200 and each of the plurality of second centered markings correspond (and align) to the center (the center of each of the holding space 150) of each of the at least one recess 135 of the bottom portion 115, respectively, as mentioned above.

Then, the resin can be mixed. The mixed resin can be poured into each of the at least one chamber 195 prior to or after the placing step.

Next, the at least one dental implant 140 can be obtained and each of the at least one dental implant 140 can be inserted into a respective one of each of the at least one recess 135 of the bottom portion 115 of the upper component 105. In this respect, the loxim 155 of each of the at least one dental implant 140, as depicted in FIG. 3, can be tightly secured via friction to the holding space 150 of the respective one of the at least one recess 135.

Afterward, the third section 230 of the at least one vertical component 170 can be inserted into a respective one of the at least one tertiary slot 190 of the at least one of the plurality of vertical walls 180 of the lower component 175. Thereafter, the at least one primary slot 125 and the at least one secondary slot 130 of the top portion 110 and the bottom portion 115, respectively, of the upper component 105 can be inserted on to the first section 220 and the second section 225 of a respective one of the at least one vertical component 170. According to this embodiment, the kit 100 can be fully assembled as shown in FIG. 3.

Subsequently, each of the at least one dental implant 140 can be immersed into a respective one of the at least one chamber 195 containing the resin by moving the upper component 105 to a predetermined height, guided by the built-in ruler 210. Once the upper component 105 is moved to the predetermined height, the locking mechanism 165 can be rotated in the first direction (clockwise direction) to cause the locking mechanism 165 to be received in one of the plurality of screw channels 240 thereby securing the upper component 105 to the at least one vertical component 170. In this context, the upper component 105 can be prevented from unintentional movement and ensuring its stability during usage.

Following, the resin can be cured (fully polymerized) for about 30 minutes to about 45 minutes in each of the at least one chamber 195 while each of the at least one dental implant 140 is being immersed in the resin to obtain the at least one resin-encapsulated dental implant 245.

After the curing step, the locking mechanism 165 can be rotated in the second direction (counterclockwise direction) to cause the locking mechanism 165 to be withdrawn from the one of the plurality of screw channels 240 thereby allowing the upper component 105 to vertically move relative to the at least one vertical component 170. In this regard, each of the at least one resin-encapsulated dental implant 245 can be removed from the respective one of the at least one chamber 195. Due to the silicone rubber lining 205 within each of the at least one chamber 195, the cured resin does not adhere to internal surfaces of the at least one chamber 195. Accordingly, the cured resin can maintain its strength and integrity.

In certain non-limiting embodiments, the removal step can be include conducting the first separation step and/or the second separation step. Conversely, in some non-limiting embodiments, the removal step can be include vertically moving the upper component 105 relative to the at least one vertical component 170 and away from the at least one chamber 195 to a predetermined removal height.

After the removal step, each of the at least one resin-encapsulated dental implant 245 can be detached from the respective one of each of the at least one recess 135 of the bottom portion 115 of the upper component 105. In a particular non-limiting embodiment, each of the detached at least one resin-encapsulated dental implant 245 can be used for preclinical research applications. The preclinical research applications can be selected from the group consisting of load-to-fracture analysis, stress-strain evaluation, aging simulations, other preclinical applications, and a combination thereof.

It is to be understood that the kit and the method of using the kit are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A kit comprising:
    an upper component comprising:
        a top portion, a bottom portion, and at least one side portion, wherein each of the at least one side portion is perpendicular to the top portion and the bottom portion,
        the top portion comprising at least one primary slot in proximity to one of the at least one side portion,
        the bottom portion comprising:
            at least one secondary slot in proximity to the one of the at least one side portion and in communication with the at least one primary slot of the top portion, and
            at least one recess, wherein each of the at least one recess is configured to receive each of at least one dental implant;
    a lower component comprising:
        a plurality of vertical walls forming an enclosure therein, the enclosure is configured to receive at least one chamber, wherein each of the at least one chamber is configured to receive a resin, and
        at least one of the plurality of vertical walls comprises at least one tertiary slot; and
    at least one vertical component, each of the at least one vertical component comprising:
        a first section, a second section, and a third section, the second section located between the first section and the third section,
        the first section and the second section are configured to receive one of the at least one primary slot and one of the at least one secondary slot of the top portion and the bottom portion, respectively, of the upper component,
        the third section is configured to receive one of the at least one tertiary slot of the lower component.

2. The kit of claim 1, wherein each of the at least one recess comprises a rubber lining configured to secure one of the at least one dental implant, respectively.

3. The kit of claim 2, wherein the rubber lining has a thickness of 3 mm.

4. The kit of claim 1, wherein one or more of the at least one side portion comprises a locking mechanism configured to allow the upper component to be secured in place when engaged and/or vertically movable along the at least one vertical component when disengaged.

5. The kit of claim 4, wherein the locking mechanism is a screw.

6. The kit of claim 5, wherein the at least one vertical component comprises a channel comprising a plurality of screw channels configured to receive the screw.

7. The kit of claim 6, wherein the channel is located at the second section of the at least one vertical component.

8. The kit of claim 4, wherein the locking mechanism is configured to rotate in a first direction to secure the upper component to the at least one vertical component and/or rotate in a second direction to vertically move the upper component relative to the at least one vertical component.

9. The kit of claim 1, wherein the at least one vertical component comprises a built-in ruler configured to allow the upper component to be accurately levelled at a predetermined height.

10. The kit of claim 1, wherein the at least one chamber comprises a silicone rubber lining.

11. The kit of claim 1, wherein the at least one vertical component is configured to separate from the upper component by slidably releasing the at least one primary slot and/or the at least one secondary slot of the top portion and the bottom portion, respectively, away from the first section of the at least one vertical component.

12. The kit of claim 1, wherein the at least one vertical component is configured to separate from the lower component by slidably releasing the third section of the at least one vertical component away from a respective one of the at least one tertiary slot of the at least one of the plurality of vertical walls of the lower component.

* * * * *